United States Patent
Lim et al.

(10) Patent No.: US 9,075,339 B2
(45) Date of Patent: *Jul. 7, 2015

(54) POLYGON MIRROR ASSEMBLY, LIGHT SCANNING UNIT EMPLOYING POLYGON MIRROR ASSEMBLY, AND IMAGE FORMING APPARATUS

(71) Applicant: Samsung Electronics Co., Ltd., Suwon-si, Gyeonggi-do (KR)

(72) Inventors: Heon-hee Lim, Suwon-si (KR); Jae-hwan Yoo, Yongin-si (KR); Jin-kwon Chun, Suwon-si (KR); Jong-wuk Ku, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/478,578

(22) Filed: Sep. 5, 2014

(65) Prior Publication Data
US 2014/0376966 A1    Dec. 25, 2014

Related U.S. Application Data

(63) Continuation of application No. 13/200,827, filed on Oct. 3, 2011, now Pat. No. 8,848,014.

(30) Foreign Application Priority Data

Nov. 24, 2010  (KR) .......................... 10-2010-0117524

(51) Int. Cl.
*G02B 26/12* (2006.01)
*G03G 15/043* (2006.01)
*G02B 5/09* (2006.01)

(52) U.S. Cl.
CPC ............... *G03G 15/043* (2013.01); *G02B 5/09* (2013.01); *G02B 26/12* (2013.01); *G02B 26/129* (2013.01)

(58) Field of Classification Search
CPC ........ G02B 26/12; G02B 26/129; G02B 5/09; G03G 15/043; B41J 2/435; B41J 27/00
USPC .................................................. 347/256–264
See application file for complete search history.

(56) References Cited

U.S. PATENT DOCUMENTS 5,124,830 A  6/1992 Omura et al.
5,359,460 A  10/1994 Urakawa
(Continued)

FOREIGN PATENT DOCUMENTS

CN  101276055   10/2008
JP  63-303316    12/1988
(Continued)

OTHER PUBLICATIONS

Extended European Search Report dated Jan. 30, 2012 issued in corresponding European Patent Application No. 11186251.2.
Office Action mailed Dec. 19, 2012 in related U.S. Appl. No. 13/200,827.
Office Action mailed Jul. 30, 2013 in related U.S. Appl. No. 13/200,827.
(Continued)

*Primary Examiner* — Sarah Al Hashimi
(74) *Attorney, Agent, or Firm* — Staas & Halsey LLP

(57) ABSTRACT

A polygon mirror assembly, a light scanning unit employing the polygon mirror assembly, and an image forming apparatus. The polygon mirror assembly includes a polygon mirror formed of a plastic material and having a plurality of reflection surfaces; and a motor unit to support and rotate the polygon mirror, where the polygon mirror is coupled to the motor unit by using an adhesive material.

20 Claims, 4 Drawing Sheets

(56) References Cited

U.S. PATENT DOCUMENTS

| | | | |
|---|---|---|---|
| 5,663,827 A * | 9/1997 | Ono et al. | 359/216.1 |
| 6,507,427 B1 | 1/2003 | Yamawaki | |
| 7,149,021 B2 | 12/2006 | Yoshizawa | |
| 8,848,014 B2 * | 9/2014 | Lim et al. | 347/261 |
| 2004/0240000 A1 * | 12/2004 | Miyatake et al. | 358/474 |
| 2004/0246552 A1 | 12/2004 | Matsui et al. | |
| 2008/0239060 A1 | 10/2008 | Jo | |

FOREIGN PATENT DOCUMENTS

| | | |
|---|---|---|
| JP | 08-244156 A | 9/1996 |
| JP | 09-274155 A | 10/1997 |
| JP | 2007-298897 A | 11/2007 |

OTHER PUBLICATIONS

Final Office Action mailed May 23, 2013 in related U.S. Appl. No. 13/200,827.
Final Office Action mailed Jan. 31, 2014 in related U.S. Appl. No. 13/200,827.
Advisory Action mailed Apr. 15, 2014 in related U.S. Appl. No. 13/200,827.
Notice of Allowance mailed May 23, 2014 in related U.S. Appl. No. 13/200,827.
U.S. Appl. No. 13/200,827, filed Oct. 3, 2011, Heon-hee Lim, Samsung Electronics Co., Ltd.
Chinese Office Action issued Nov. 4, 2014 in corresponding Chinese Patent Application No. 201110377535.7.

* cited by examiner

POLYGON MIRROR ASSEMBLY, LIGHT SCANNING UNIT EMPLOYING POLYGON MIRROR ASSEMBLY, AND IMAGE FORMING APPARATUS

CROSS-REFERENCE TO RELATED APPLICATIONS

This application is a continuation of U.S. application Ser. No. 13/200,827, filed on Oct. 3, 2011, which claims the benefit of Korean Patent Application No. 10-2010-0117524, filed on Nov. 24, 2010, in the Korean Intellectual Property Office, the disclosures of which are incorporated herein by reference in their entirety.

BACKGROUND

1. Field

The present disclosure relates to a polygon mirror assembly, a light scanning unit employing the polygon mirror assembly, and an image forming apparatus, and more particularly, to a polygon mirror assembly including a plastic polygon mirror, a light scanning unit employing the polygon mirror assembly, and an image forming apparatus.

2. Description of the Related Art

Light scanning units that are employed in electrophotographic image forming apparatuses such as laser printers, digital photocopy machines, and facsimile machines deflect a light beam emitted from a light source to which an image signal is applied and scan the light beam in a main scanning direction of an image carrier. Electrostatic images are formed on image carriers by using the light scanning units in a main scanning direction and by movement of the image carriers in a sub scanning direction.

A light scanning unit includes a polygon mirror assembly for deflecting a light beam emitted from a light source in a predetermined direction. A conventional polygon mirror is generally produced through ultraprecision machining using high-purity aluminum having a purity of more than 99% in order to obtain a reflectivity of more than 85%. The polygon mirror assembly formed of the high-purity aluminum has problems such as a high manufacturing cost and difficulty in adjusting production volume.

SUMMARY

The present disclosure provides a polygon mirror assembly that uses a plastic polygon mirror and may minimize performance degradation occurring during assembling, a light scanning unit employing the polygon mirror assembly, and an image forming apparatus.

According to an aspect of the present disclosure, there is provided a polygon mirror assembly including: a polygon mirror formed of a plastic material and having a plurality of reflection surfaces; and a motor unit to support and rotate the polygon mirror, wherein the polygon mirror is coupled to the motor unit by using an adhesive material.

A holder frame may be coupled to a rotation axis of the motor unit, and the polygon mirror may be coupled to the holder frame by using the adhesive material. The polygon mirror may include a hole, and a part of the holder frame is inserted into the hole of the polygon mirror, and the adhesive material may be uniformly coated on at least one of an inner surface of the polygon mirror defining the hole and an outer surface of the holder frame contacting the inner surface.

A tilt preventing groove having a space for accommodating the adhesive material may be formed in the holder frame. The tilt preventing groove may be a groove formed on a surface of the holder frame around the part of the holder frame inserted into the hole of the polygon mirror.

A tilt preventing step having a space for accommodating the adhesive material may be formed in the inner surface of the polygon mirror. The tilt preventing step may be a groove formed on a lower circumferential surface of the inner surface of the polygon mirror.

The polygon mirror may include a hole, a rotation axis of the motor unit may be inserted into the hole of the polygon mirror, and the adhesive material may be uniformly coated on at least one of an inner surface of the polygon mirror defining the hole and the rotation axis of the motor unit.

The adhesive material may be any one selected from the group consisting of an ultraviolet (UV)-curable adhesive material, a heat-curable adhesive material, and an instant adhesive material.

A reflection layer may be formed on each of the plurality of reflection surfaces.

According to another aspect of the present disclosure, there is provided a light scanning unit including: a light source to emit a light beam; a polygon mirror assembly to deflect the light beam emitted from the light source in a main scanning direction; an imaging optical unit to image the light beam deflected by the polygon mirror assembly onto a surface that is to be scanned, wherein the polygon mirror assembly is formed of a plastic material and includes a polygon mirror having a plurality of reflection surfaces and a motor unit to support and rotate the polygon mirror, and wherein the polygon mirror is coupled to the motor unit by using an adhesive material.

According to another aspect of the present disclosure, there is provided an image forming apparatus including: a light scanning unit including: a light source to emit a light beam; a polygon mirror assembly to deflect the light beam emitted from the light source in a main scanning direction; an imaging optical unit to image the light beam deflected by the polygon mirror assembly onto a surface that is to be scanned; a developing unit disposed on a focusing point of the light beam emitted from the light scanning unit, and including a plurality of photoreceptors on each of which an electrostatic latent image is formed and a developing roller to develop the electrostatic latent image formed on each of the photoreceptors; and a transfer unit to transfer an image developed by the developing unit, wherein the polygon mirror assembly is formed of a plastic material, includes a polygon mirror having a plurality of reflection surfaces and a motor unit to support and rotate the polygon mirror, and wherein the polygon mirror is coupled to the motor unit by using an adhesive material.

The polygon mirror assembly, the light scanning unit employing the polygon mirror assembly, and the image forming apparatus suppress optical performance degradation by minimizing deformation that may occur when the polygon mirror formed of a plastic material is assembled.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

Figure 1:
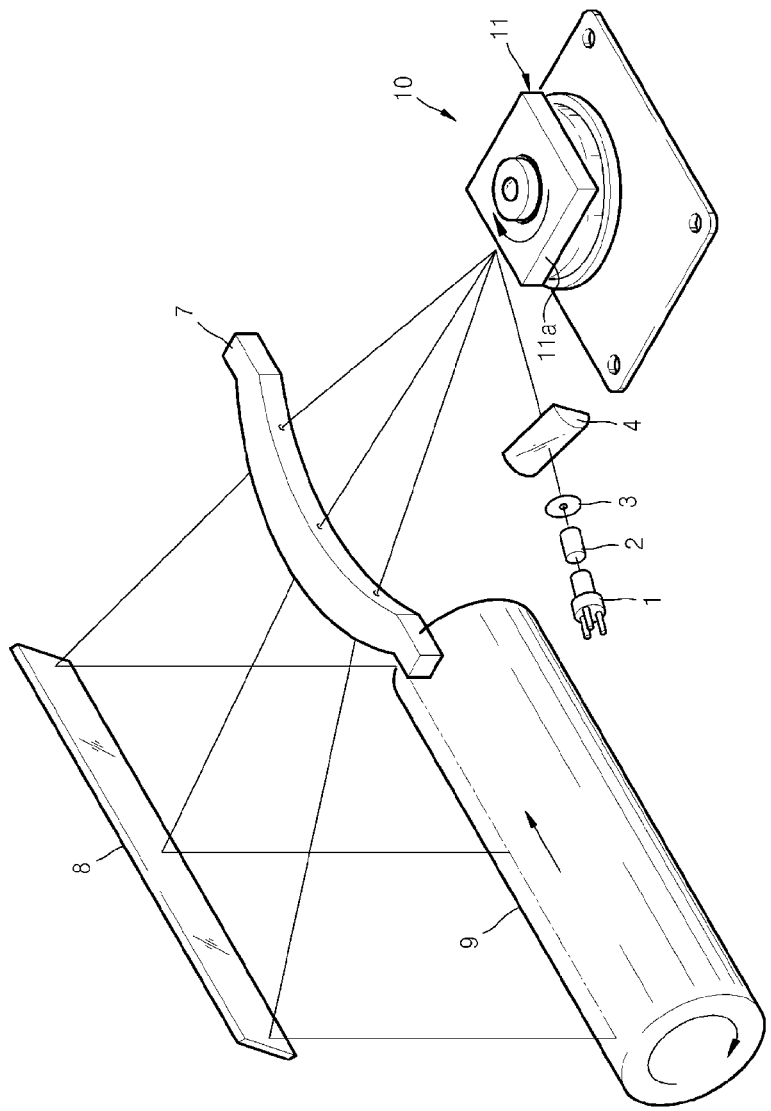
FIG. 1 is a schematic view of a light scanning unit according to an embodiment of the present disclosure.

Hereinafter, the present disclosure will now be described more fully with reference to the accompanying drawings, in which exemplary embodiments of the disclosure are shown. In the drawings, like reference numerals denote like elements, and a size of each component is exaggerated for convenience and clarity.

Figure 2:
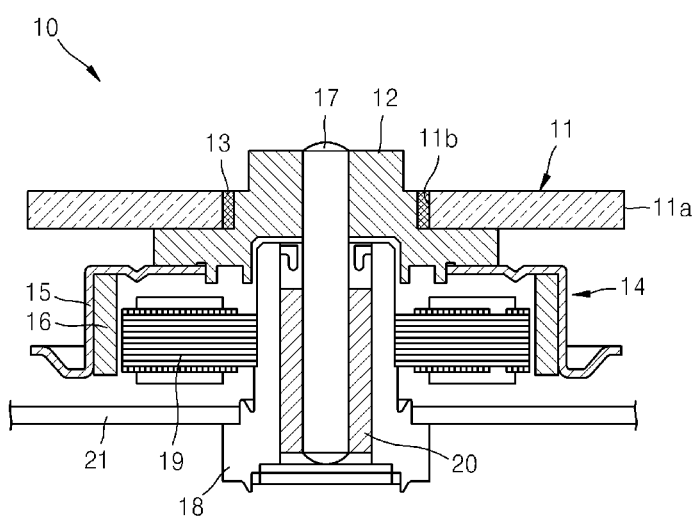
FIG. 2 is a schematic cross-sectional view of a polygon mirror assembly employed in the light scanning unit of FIG. 1.

FIG. 1 is a schematic view of a light scanning unit employing a polygon mirror assembly 10, according to an embodiment of the present disclosure. FIG. 2 is a schematic cross-sectional view of the polygon mirror assembly 10 of the current embodiment.

Referring to FIG. 1, the light scanning unit includes a light source 1; the polygon mirror assembly 10 including a rotational polygon mirror 11, and a scanning lens 7.

The light source 1 emits a light beam and may be a semiconductor laser diode for emitting a laser beam. The light source 1 may emit a single light beam or a plurality of light beams. FIG. 1 illustrates the light source 1 emitting a single light beam. If the light source 1 emits a plurality of light beams, the light beams may be incident on one of a plurality of reflection surfaces 11a at different incident angles or incident on a plurality of the reflection surfaces 11a.

A collimating lens 2 may be disposed on an optical path between the light source 1 and the polygon mirror 11. The collimating lens 2 collimates light emitted from the light source 1. A cylindrical lens 4 may further be disposed on an optical path between the collimating lens 2 and the polygon mirror 11. The cylindrical lens 4, that is, an optical unit having a predetermined power in only a sub scanning direction, focuses a light beam from the collimating lens 2 onto a reflection surface 11a of the polygon mirror 11 in the sub scanning direction. An aperture stopper 3 may further be disposed between the collimating lens 2 and the cylindrical lens 4 to adjust a diameter of a light beam. The collimating lens 2, the aperture stopper 3, and the cylindrical lens 4 constitute an incident optical unit of the light scanning unit.

The scanning lens 7, that is, an imaging optical unit having a convergence function and fθ lens characteristics, images a light beam that is deflected and scanned by the polygon mirror 11 onto an outer circumferential surface of a photoreceptor 9 at a constant speed. FIG. 1 illustrates one scanning lens 7 as the imaging optical unit. However, the imaging optical unit may include 2 or more lenses. A mirror 8 is an example of an optical path changing unit that changes an optical path of a scanned light beam.

Referring to FIG. 2, the polygon mirror assembly 10 includes the polygon mirror 11, a holder frame 12, and a motor unit 14.

The polygon mirror 11 includes four reflection surfaces 11a formed on an outer surface of the polygon mirror 11 and an inner surface 11b defining a hole formed in a center portion of the polygon mirror 11. The inner surface 11b of the polygon mirror 11 and an outer surface of the holder frame 12 contacting the inner surface 11b are coupled to each other through an adhesive material 13. The polygon mirror 11 may be formed of plastic, such as epoxy, by using an injection molding process. As the polygon mirror 11 is formed of a plastic material, a material cost of the polygon mirror 11 may be decreased and mass production of the polygon mirror 11 may be easily performed. The adhesive material 13 may be any of an ultraviolet (UV)-curable adhesive material, a heat-curable adhesive material, an instant adhesive material, and the like. For example, when the adhesive material 13 is a UV-curable adhesive material, the adhesive material 13 is coated on the inner surface 11b of the polygon mirror 11 and the outer surface of the holder frame 12 contacting the inner surface 11b, the polygon mirror 11 and the holder frame 12 are coupled to each other, and UV light is then irradiated thereon by using a UV lamp to rapidly harden the adhesive material 13, thereby fixing the polygon mirror 11 and the holder frame 12.

Meanwhile, a metal layer with a high reflectivity formed of, for example, aluminum (Al) or silver (Ag) may be attached on each reflection surface 11a. In order to protect the metal layer from external environment and to prevent oxidization of the metal layer, a protection layer, for example, a $SiO_2$ layer, may further be prepared on the metal layer. The number of reflection surfaces 11a shown is just an example, and the present disclosure is not limited to four reflection surfaces 11a. Also, the inner surface 11b of the polygon mirror 11 and the outer surface of the holder frame 12 contacting the inner surface 11b may have a cylindrical shape for convenience of assembling, but the present disclosure is not limited thereto. For example, the inner surface 11b of the polygon mirror 11 and the outer surface of the holder frame 12 contacting the inner surface 11b may have a polygonal shape, for example, a quadrangle shape.

Meanwhile, the motor unit 14 includes a bearing holder 18 fixed to a printed circuit board 21, an electromagnet 19 disposed on a circumferential surface of the bearing holder 18, a shaft 17 as a rotation axis formed in the bearing holder 18 and able to revolve, a bushing 20 disposed between the bearing holder 18 and the shaft 17, a rotor housing 15 coupled to the shaft 17, and a permanent magnet 16 disposed inside the rotor housing 15 and facing the electromagnet 19.

However, in a conventional polygon mirror assembly, a polygon mirror is fixed to a holder frame or a motor unit by using a flat spring. Even though an elastic force from the flat spring deforms the polygon mirror, the conventional polygon mirror is generally formed of a metal such as Al, and thus the deformation due to the flat spring may be insignificant. However, the inventors have found that if the polygon mirror 11 is formed of plastic, using a flat spring to attach the polygon mirror 11 considerably deforms the polygon mirror 11. In other words, even though a polygon mirror formed of a metal is attached through spring insertion, since the Young's modulus thereof is sufficiently great, a deformation amount is not significant. On the other hand, a polygon mirror formed of a plastic material has a small Young's modulus, and thus a deformation amount due to spring insertion is great.

Table 1 shows deformation amounts of reflection surfaces of a polygon mirror formed of a plastic material due to spring insertion.

TABLE 1

| surface | initial reflection surface PV (μm) | reflection surface PV (μm) after assembling | Deformation amount (μm) |
|---|---|---|---|
| 1 | 0.392 | 1.220 | 0.828 |
| 2 | 0.341 | 2.993 | 2.652 |
| 3 | 0.343 | 1.485 | 1.142 |
| 4 | 0.366 | 3.102 | 2.736 |
| average | 0.361 | 2.200 | 1.840 |

Here, the reflection surface process variables (PV) each denote a deviation between a maximum value and a minimum value with respect to an entire area of a reflection surface, that is, flatness. Referring to Table 1, the average deformation amount of the reflection surfaces of the polygon mirror formed of a plastic material is about 1.840 μm. However, since a permissible deformation amount of the polygon mirror is to be within the range of about 0.2 μm to about 0.3 μm, the deformation amount due to the spring insertion greatly exceeds the permissible amount, and thus it is difficult to apply a method of attaching the conventional polygon mirror formed of a metal to the polygon mirror formed of plastic.

Thus, as described in the current embodiment, stress applied to the polygon mirror 11 during assembling may be minimized by coupling the polygon mirror 11 and the holder frame 12 to each other by using the adhesive material 13. As such, deformation of the reflection surfaces 11a of the polygon mirror 11 during assembling may be minimized by minimizing stress applied to the polygon mirror 11 during assembling, thereby preventing performance degradation of the light scanning unit.

Table 2 shows deformation amounts of the reflection surfaces 11a of the polygon mirror 11 formed of a plastic material during assembling using the adhesive material 13.

TABLE 2

| sample no. | surface | initial reflection surface PV (μm) | reflection surface PV (μm) after assembling | Deformation amount (μm) |
|---|---|---|---|---|
| 1 | 1 | 0.480 | 0.581 | 0.101 |
|   | 2 | 0.386 | 0.321 | −0.065 |
|   | 3 | 0.466 | 0.460 | −0.006 |
|   | 4 | 0.426 | 0.478 | 0.052 |
| 2 | 1 | 0.477 | 0.733 | 0.256 |
|   | 2 | 0.399 | 0.405 | 0.006 |
|   | 3 | 0.443 | 0.703 | 0.260 |
|   | 4 | 0.447 | 0.360 | −0.087 |
| 3 | 1 | 0.422 | 0.740 | 0.318 |
|   | 2 | 0.347 | 0.386 | 0.039 |
|   | 3 | 0.421 | 0.837 | 0.416 |
|   | 4 | 0.398 | 0.505 | 0.107 |
| 4 | 1 | 0.482 | 0.431 | −0.051 |
|   | 2 | 0.293 | 0.452 | 0.159 |
|   | 3 | 0.647 | 0.412 | −0.235 |
|   | 4 | 0.302 | 0.372 | 0.070 |
| 5 | 1 | 0.497 | 0.937 | 0.440 |
|   | 2 | 0.323 | 0.319 | −0.004 |
|   | 3 | 0.472 | 0.613 | 0.141 |
|   | 4 | 0.345 | 0.336 | −0.009 |
| average |   | 0.424 | 0.519 | 0.095 |

Here, the reflection surface process variables (PV) each denote a deviation between a maximum value and a minimum value of a deformation amount with respect to an entire area of a reflection surface. Referring to Table 2, when the polygon mirror 11 is coupled to the holder frame 12 by using the adhesive material 13, the average deformation amount occurring during assembling among the reflection surfaces 11a of the polygon mirror 11 formed of a plastic material is just about 0.095 μm, and thus a general permissible deformation amount of the polygon mirror 11 is within the range of about 0.2 μm to about 0.3 μm.

Even though the deformation amount of each reflection surface 11a is remarkably improved by using the adhesive material 13, deformation amounts of the reflection surface 11a due to contraction of the adhesive material 13 may still exist. If the adhesive material 13 is partially coated on an upper portion or a lower portion of the inner surface 11b of the polygon mirror 11, the polygon mirror 11 may be partially deformed. Accordingly, in order to make deformation distribution of the polygon mirror 11 uniform, the adhesive material 13 is uniformly coated on the inner surface 11b of the polygon mirror 11 or on the outer surface of the holder frame 12 contacting the inner surface 11b.

Referring back to FIGS. 1 and 2, operations of the light scanning unit of the current embodiment will be described below.

Light emitted from the light source 1 passes through the collimating lens 2, the aperture stopper 3, and the cylindrical lens 4 sequentially in the order stated, and is then irradiated onto the reflection surface 11a of the polygon mirror 11. The light reflected by the reflection surface 11a of the polygon mirror 11 passes through the scanning lens 7, is deflected by the mirror 8, and then is irradiated onto the surface of the photoreceptor 9. If power is supplied to the electromagnet 19 of the motor unit 14, the rotor housing 15 rotates about the shaft 17 due to an electromagnetic interaction between the electromagnet 19 and the permanent magnet 16. The holder frame 12 is coupled to and rotates together with the rotor housing 15 and the shaft 17, and the polygon mirror 11 adhered to the holder frame 12 rotates together with the holder frame 12, the rotor housing 15, and the shaft 17. As such, when the polygon mirror 11 rotates due to driving of the motor unit 14, the light reflected by the reflection surface 11a of the polygon mirror 11 is scanned in a direction perpendicular to a rotation axis of the polygon mirror 11, that is, in a main scanning direction. Meanwhile, the photoreceptor 9 moves its scanned surface in a direction perpendicular to the direction in which the photoreceptor 9 is scanned by the polygon mirror 11. Accordingly, an electrostatic latent image comprised of exposed regions and unexposed regions is formed on the scanned surface of the photoreceptor 9 by turning on and off the light source 1.

Hereinafter, other examples of the polygon mirror assembly 10 of the current embodiment will be described below.

Figure 3:
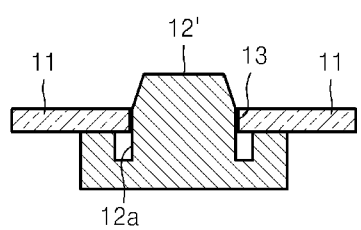
FIG. 3 is another example of the polygon mirror assembly of FIG. 2.

FIG. 3 illustrates another example of the polygon mirror assembly 10 of FIG. 2. Referring to FIG. 3, the polygon mirror assembly 10 of the current embodiment includes a plurality of tilt preventing grooves 12a formed in a holder frame 12'. The tilt preventing grooves 12a may be formed to have a predetermined depth in at least a part of a surface of the holder frame 12' around a projection portion inserted into the inner surface 11b of the polygon mirror 11. The tilt preventing grooves 12a of the holder frame 12' may receive the adhesive material 13 discharged from between surfaces of the polygon mirror 11 and the holder frame 12' that contact each other.

Figure 4:
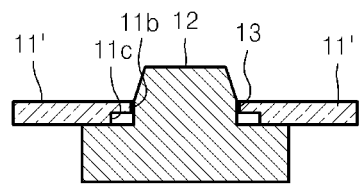
FIG. 4 is another example of the polygon mirror assembly of FIG. 2.

FIG. 4 illustrates another example of the polygon mirror assembly 10 of FIG. 2. Referring to FIG. 4, the polygon mirror assembly 10 of the current embodiment includes a plurality of tilt preventing steps 11c formed in an inner surface 11b of a polygon mirror 11'. The tilt preventing steps 11c may be formed to have a predetermined depth in at least a part of a lower circumferential surface of the inner surface 11b of the polygon mirror 11'. The tilt preventing steps 11c of the polygon mirror 11' may receive the adhesive material 13 discharged from between surfaces of the polygon mirror 11' and the holder frame 12 that contact each other.

Figure 5:
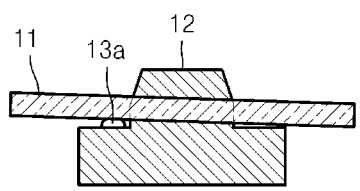
FIG. 5 is a view illustrating the polygon mirror assembly of FIG. 2, in which a polygon mirror tilts due to an adhesive material discharged from the polygon mirror assembly of FIG. 2.

Referring to FIG. 5, when the polygon mirror 11 is coupled to the holder frame 12 by using the adhesive material 13, a part 13a of the adhesive material 13 may harden after being discharged downward from between the inner surface 11b of the polygon mirror 11 and the outer surface of the holder frame 12 contacting the inner surface 11b. As such, the discharged adhesive material 13a may tilt the polygon mirror 11 to one side. Due to the tilt of the polygon mirror 11, error amounts of a dot on a sheet of paper on which an image is printed in a vertical direction are obtained as shown in Table 3.

TABLE 3

| DPA (") | difference in vertical direction (μm) |
|---|---|
| 600 | 15 |
| 300 | 7.1 |
| 120 | 3 |
| 60 | 1.5 |
| 0 | 0 |

In Table 3, the dynamic pyramidal angles (DPA) each denote a slant of a rotation axis of the motor unit 14, that is, a tilt amount of the shaft 17 and the reflection surface 11a, and the DPA is in units of seconds ("). As shown in Table 3, the tilt of the polygon mirror 11 due to the discharged adhesive material 13a causes blurring of dots printed on a sheet of paper, thereby degrading a picture quality. Thus, as shown in the examples illustrated in FIGS. 3 and 4, tilt due to the discharged adhesive material 13a may be prevented through the tilt preventing grooves 12a or the tilt preventing steps 11c of the polygon mirror 11'.

In the above-described embodiments and other examples, the polygon mirrors 11 and 11' are coupled to the motor unit 14 through the holder frames 12 and 12', but the present disclosure is not limited thereto. The holder frames 12 and 12' may be omitted, and the shaft 17 of the motor unit 14 may be directly coupled to the polygon mirrors 11 and 11' by using the adhesive material 13.

Figure 6:
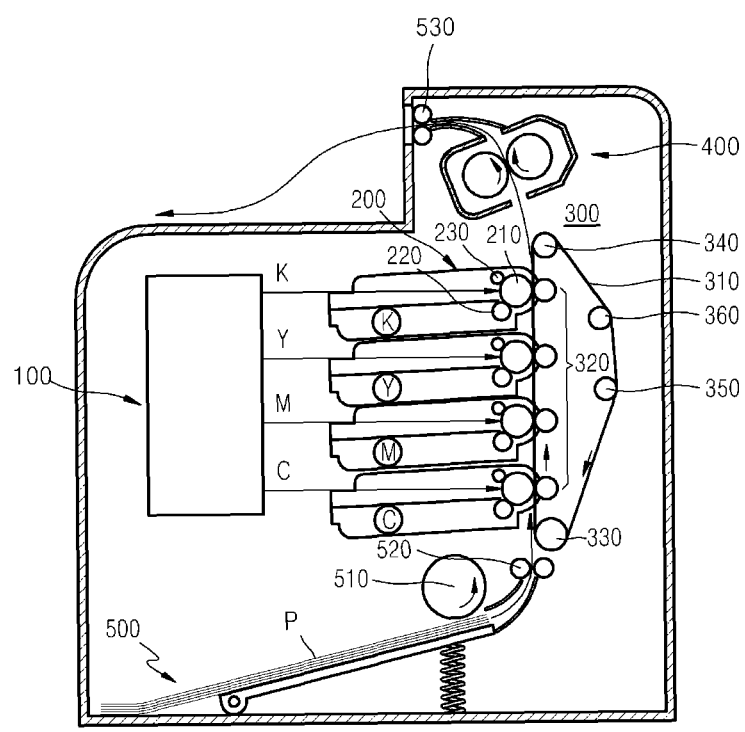
FIG. 6 is a schematic view of an electrophotographic image forming apparatus according to an embodiment of the present disclosure.

FIG. 6 is an example of an image forming apparatus employing the light scanning unit of the current embodiment.

The image forming apparatus illustrated in FIG. 6 is a dry electrophotographic image forming apparatus for printing a color image by using a dry developer (hereinafter, referred to as toner).

The image forming apparatus includes a light scanning unit 100, a plurality of developing units 200, a transfer unit 300, and a fixing unit 400.

The light scanning unit 100 may be the light scanning unit described above. In order to print a color image, the light scanning unit 100 scans a plurality of light beams, and the plurality of developing units 200, one for each of colors to be printed, may be formed to correspond to the plurality of light beams. In this regard, the light scanning unit 100 may include a plurality of light scanning units or may simultaneously scan a plurality of light beams using one polygon mirror assembly, as described above with reference to FIG. 1. For example, the light scanning unit 100 may scan four light beams corresponding to black (K), magenta (M), yellow (Y), and cyan (C), and four developing units 200 for black (K), magenta (M), yellow (Y), and cyan (C) may be formed.

The developing units 200 each include a photosensitive drum 210, that is, an image receptor, on which an electrostatic latent image is formed and a developing roller 220 for developing the electrostatic latent image.

The photosensitive drum 210, that is, a photoreceptor, may be a cylindrical metal pipe having a photosensitive layer that has a predetermined thickness and that is formed on an outer circumference of the cylindrical metal pipe. Although not shown herein, a photosensitive belt may be employed as the photoreceptor. The outer circumference of the photosensitive drum 210 is a surface that is to be exposed. A charge roller 230 is disposed on the outer circumference of the photosensitive drum 210 on a portion of the outer circumference of the photosensitive drum 210 upstream from a region of the outer circumference that is to be exposed to the light scanning unit 100. The charge roller 230 is a charging unit that contacts the photosensitive drum 210 and rotates to apply a uniform charge to the surface of the photosensitive drum 210. A charge bias is applied to the charge roller 230. A corona charging unit (not shown) may be used instead of the charge roller 230.

The developing roller 220 supplies toner adhered to its outer circumference to the photosensitive drum 210. A development bias is applied to the developing roller 220 to supply toner to the photosensitive drum 210. Although it is not illustrated in the drawings, the developing units 200 may further include a supply roller for allowing toner contained in the developing units 200 to adhere to the developing roller 220, a restriction unit for restricting an amount of the toner adhered to the developing roller 220, and an agitator for transferring the toner contained in each of the developing units 200 to the supply roller and/or the developing roller 220.

The transfer unit 300 may include a paper transfer belt 310 and four transfer rollers 320. The paper transfer belt 310 is arranged to face a region of the outer circumference of the photosensitive drum 210 exposed out of each developing unit 200. The paper transfer belt 310 circulates by being supported by a plurality of support rollers 330, 340, 350, and 360. The four transfer rollers 320 are arranged to face the photosensitive drum 210 of each developing unit 200 with the paper transfer belt 310 interposed therebetween. A transfer bias is applied to each of the transfer rollers 320.

A color image forming process that may be performed the electrophotographic image forming apparatus configured as detailed above will be described.

The photosensitive drum 210 of each developing unit 200 is charged to have a uniform electric potential by a charge bias applied to the charge roller 230. The light scanning unit 100 scans four light beams corresponding to image information of cyan (C), magenta (M), yellow (Y), and black (K) colors to each photosensitive drum 210 of the developing units 200 to form electrostatic latent image. A development bias is applied to the developing roller 220. Then, toner adhered to the outer circumference of the developing roller 220 adheres to the electrostatic latent image on the photosensitive drum 210 and thus toner images of cyan, magenta, yellow, and black may be respectively formed on the photosensitive drums 210 of the developing units 200.

A medium that finally receives toner, for example, a paper P, is ejected from a cassette 500 by a pickup roller 510. The paper P is transferred to the paper transfer belt 510 by a transfer roller 520. The paper P adheres to a surface of the paper transfer belt 310 due to an electrostatic force and is transferred at the same velocity as a running linear velocity of the paper transfer belt 310.

For example, a leading end of the paper P arrives at a transfer nip at the same time as when a leading end of a toner image of cyan (C) formed on the outer circumferential surface of one photosensitive drum 210 of one developing unit 200 arrives at the transfer nip facing one of the transfer rollers 320.

When a transfer bias is applied to the transfer roller 320, the toner image formed on the photosensitive drum 210 is transferred to the paper P. As the paper P is transferred, toner images of magenta (M), yellow (Y), and black (K) formed on the photosensitive drums 210 of the other developing units 200 are sequentially transferred to the paper P to overlap with one another. Accordingly, a color toner image is formed on the paper P.

The color toner image transferred to the paper P is maintained on a surface of the paper P due to an electrostatic force. The fixing device 400 fixes the color toner image on the paper P using heat and pressure. The paper P after being subjected to the fixing process is ejected out of the image forming apparatus by an eject roller 530.

While the present disclosure has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A polygon mirror assembly comprising:
a polygon mirror formed of a plastic material and having a plurality of reflection surfaces;
a motor unit to support and rotate the polygon mirror, the polygon mirror being coupled to the motor unit by an adhesive material; and
a holder frame coupled to a rotation axis of the motor unit, the polygon mirror being coupled to the holder frame by the adhesive material,
wherein the polygon mirror comprises a hole, a part of the holder frame being inserted into the hole, and the adhesive material uniformly covers an innermost diametrical surface of the polygon mirror defining the hole, and
wherein a tilt preventing step having a space to accommodate adhesive material discharged from between the polygon mirror and an outer surface of the holder frame is formed on a lower side of the innermost diametrical surface of the polygon mirror.

2. The polygon mirror assembly of claim 1, wherein a tilt preventing groove having a space to accommodate the adhesive material is formed in the holder frame.

3. The polygon mirror assembly of claim 2, wherein the tilt preventing groove is a groove formed on a surface of the holder frame around the part of the holder frame inserted into the hole of the polygon mirror.

4. The polygon mirror assembly of claim 1, wherein the adhesive material is any one selected from the group consisting of an ultraviolet (UV)-curable adhesive material, a heat-curable adhesive material, and an instant adhesive material.

5. The polygon mirror assembly of claim 1, wherein a reflection layer is formed on each of the plurality of reflection surfaces.

6. A polygon mirror assembly comprising:
a polygon mirror formed of a plastic material and having a plurality of reflection surfaces;
a motor unit to support and rotate the polygon mirror, the polygon mirror being coupled to the motor unit by an adhesive material; and
a holder frame coupled to a rotation axis of the motor unit, the polygon mirror being coupled to the holder frame by the adhesive material,
wherein the polygon mirror comprises a hole, a part of the holder frame being inserted into the hole, and the adhesive material uniformly covers an innermost diametrical surface of the polygon mirror defining the hole, and
wherein a tilt preventing groove having a space to accommodate the adhesive material discharged from between the polygon mirror and an outer surface of the holder frame is formed on a surface of the holder frame around the part of the holder frame inserted into the hole of the polygon mirror.

7. A polygon mirror assembly comprising:
a polygon mirror formed of a plastic material and having a plurality of reflection surfaces; and
a motor unit to support and rotate the polygon mirror, the polygon mirror being coupled to the motor unit by an adhesive material,
wherein the polygon mirror comprises a hole, a rotation axis of the motor unit is inserted into the hole of the polygon mirror, and the adhesive material uniformly covers an innermost diametrical surface of the polygon mirror defining the hole, and,
wherein a tilt preventing step having a space to accommodate adhesive material discharged from between the polygon mirror and the rotation axis of the motor unit is formed on a lower side of the innermost diametrical surface of the polygon mirror.

8. A light scanning unit comprising:
a light source to emit a light beam;
a polygon mirror assembly to deflect the light beam emitted from the light source in a main scanning direction; and
an imaging optical unit to image the light beam deflected by the polygon mirror assembly onto a surface that is to be scanned,
wherein the polygon mirror assembly comprises a polygon mirror formed of a plastic material and having a plurality of reflection surfaces, and a motor unit to support and rotate the polygon mirror, and wherein the polygon mirror is coupled to the motor unit by an adhesive material
wherein a holder frame is coupled to a rotation axis of the motor unit, and the polygon mirror is coupled to the holder frame by the adhesive material,
wherein the polygon mirror comprises a hole, and a part of the holder frame is inserted into the hole of the polygon mirror, and the adhesive material uniformly covers an innermost diametrical surface of the polygon mirror to define the hole, and
wherein a tilt preventing step having a space to accommodate adhesive material discharged from between the polygon mirror and an outer surface of the holder frame is formed on a lower part of the innermost diametrical surface of the polygon mirror.

9. The light scanning unit of claim 8, wherein a tilt preventing groove having a space to accommodate the adhesive material is formed in the holder frame.

10. The light scanning unit of claim 9, wherein the tilt preventing groove is a groove formed on a surface of the holder frame around the part of the holder frame inserted into the hole of the polygon mirror.

11. The light scanning unit of claim 9, wherein the adhesive material is any one selected from the group consisting of an ultraviolet (UV)-curable adhesive material, a heat-curable adhesive material, and an instant adhesive material.

12. The polygon mirror assembly of claim 9, wherein a reflection layer is formed on each of the plurality of reflection surfaces.

13. A light scanning unit comprising:
a light source to emit a light beam;
a polygon mirror assembly to deflect the light beam emitted from the light source in a main scanning direction; and an imaging optical unit to image the light beam deflected by the polygon mirror assembly onto a surface that is to be scanned, wherein the polygon mirror assembly comprises a polygon mirror formed of a plastic material and having a plurality of reflection surfaces and a motor unit to support and rotate the polygon mirror, and wherein the polygon mirror is coupled to the motor unit by an adhesive material wherein a holder frame is coupled to a rotation axis of the motor unit, and the polygon mirror is coupled to the holder frame by the adhesive material, wherein the polygon mirror comprises a hole, a part of the holder frame being inserted into the hole, and the adhesive material uniformly covers an innermost diametrical surface of the polygon mirror defining the hole, and wherein a tilt preventing groove having a space to accommodate the adhesive material discharged from between the polygon mirror and an outer surface of the holder frame is formed on a surface of the holder frame around the part of the holder frame inserted into the hole of the polygon mirror.

14. A light scanning unit comprising:

a light source to emit a light beam;

a polygon mirror assembly to deflect the light beam emitted from the light source in a main scanning direction; and an imaging optical unit to image the light beam deflected by the polygon mirror assembly onto a surface that is to be scanned, wherein the polygon mirror assembly comprises a polygon mirror formed of a plastic material and having a plurality of reflection surfaces and a motor unit to support and rotate the polygon mirror, wherein the polygon mirror comprises a hole, a rotation axis of the motor unit is inserted into the hole of the polygon mirror and the adhesive material uniformly covers an innermost diametrical surface of the polygon mirror defining the hole, and wherein a tilt preventing step having a space to accommodate adhesive material discharged from between the polygon mirror and the rotation axis of the motor unit is formed on a lower side of the innermost diametrical surface of the polygon mirror.

15. An image forming apparatus comprising:

a light scanning unit comprising: a light source to emit a light beam; a polygon mirror assembly to deflect the light beam emitted from the light source in a main scanning direction; and an imaging optical unit to image the light beam deflected by the polygon mirror assembly onto a surface that is to be scanned;

a developing unit disposed on a focusing point of the light beam emitted from the light scanning unit, and comprising a plurality of photoreceptors on each of which an electrostatic latent image is formed and a developing roller to develop the electrostatic latent image formed on each of the photoreceptors; and a transfer unit to transfer an image developed by the developing unit, wherein the polygon mirror assembly comprises a polygon mirror formed of a plastic material and having a plurality of reflection surfaces and a motor unit to support and rotate the polygon mirror, and wherein the polygon mirror is coupled to the motor unit by an adhesive material, wherein a holder frame is coupled to a rotation axis of the motor unit, and the polygon mirror is coupled to the holder frame by the adhesive material, wherein the polygon mirror comprises a hole, and a part of the holder frame is inserted into the hole of the polygon mirror, and the adhesive material uniformly covers an innermost diametrical surface of the polygon mirror to define the hole, and wherein a tilt preventing step having a space to accommodate adhesive material discharged from between the polygon mirror and an outer surface of the holder frame is formed on a lower part of the innermost diametrical surface of the polygon mirror.

16. The image forming apparatus of claim 15, wherein a tilt preventing groove having a space to accommodate the adhesive material is formed in the holder frame.

17. The image forming apparatus of claim 16, wherein the tilt preventing groove is a groove formed on a surface of the holder frame around the part of the holder frame inserted into the hole of the polygon mirror.

18. The image forming apparatus of claim 15, wherein the adhesive material is any one selected from the group consisting of an ultraviolet (UV)-curable adhesive material, a heat-curable adhesive material, and an instant adhesive material.

19. An image forming apparatus comprising:

a light scanning unit comprising: a light source to emit a light beam; a polygon mirror assembly to deflect the light beam emitted from the light source in a main scanning direction; and an imaging optical unit to image the light beam deflected by the polygon mirror assembly onto a surface that is to be scanned;

a developing unit disposed on a focusing point of the light beam emitted from the light scanning unit, and comprising a plurality of photoreceptors on each of which an electrostatic latent image is formed and a developing roller to develop the electrostatic latent image formed on each of the photoreceptors; and a transfer unit to transfer an image developed by the developing unit, wherein the polygon mirror assembly comprises a polygon mirror formed of a plastic material and having a plurality of reflection surfaces and a motor unit to support and rotate the polygon mirror, and wherein the polygon mirror is coupled to the motor unit by an adhesive material, wherein a holder frame is coupled to a rotation axis of the motor unit, and the polygon mirror is coupled to the holder frame by the adhesive material, wherein the polygon mirror comprises a hole, a part of the holder frame being inserted into the hole, and the adhesive material uniformly covers an innermost diametrical surface of the polygon mirror defining the hole, and wherein a tilt preventing groove having a space to accommodate the adhesive material discharged from between the polygon mirror and an outer surface of the holder frame is formed on a surface of the holder frame around the part of the holder frame inserted into the hole of the polygon mirror.

20. An image forming apparatus comprising:

a light scanning unit comprising a light source to emit a light beam, a polygon mirror assembly to deflect the light beam emitted from the light source in a main scanning direction, and an imaging optical unit to image the light beam deflected by the polygon mirror assembly onto a surface that is to be scanned;

a developing unit disposed on a focusing point of the light beam emitted from the light scanning unit, and comprising a plurality of photoreceptors on each of which an electrostatic latent image is formed and a developing roller to develop the electrostatic latent image formed on each of the photoreceptors; and a transfer unit to transfer an image developed by the developing unit, wherein the polygon mirror assembly comprises a polygon mirror formed of a plastic material and having a plurality of reflection surfaces and a motor unit to support and rotate the polygon mirror, and wherein the polygon mirror is coupled to the motor unit by an adhesive material, wherein the polygon mirror comprises a hole, a rotation axis of the motor unit is inserted into the hole of the polygon mirror, and the adhesive material uniformly covers an innermost diametrical surface of the polygon mirror defining the hole, and wherein a tilt preventing step having a space to accommodate adhesive material discharged from between the polygon mirror and the rotation axis of the motor unit is formed on a lower side of the innermost diametrical surface of the polygon mirror.

* * * * *